(12) United States Patent
Kim et al.

(10) Patent No.: US 10,713,815 B1
(45) Date of Patent: Jul. 14, 2020

(54) METHOD AND DEVICE FOR SUPPORTING ADMINISTRATORS TO PROCESSES OF OBJECT DETECTORS TO PROVIDE LOGICAL DRIVING

(71) Applicant: StradVision, Inc., Gyeongsangbuk-do (KR)

(72) Inventors: Kye-Hyeon Kim, Seoul (KR); Yongjoong Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Dongsoo Shin, Gyeonggi-do (KR); Donghun Yeo, Gyeongsangbuk-do (KR); Wooju Ryu, Gyeongsangbuk-do (KR); Myeong-Chun Lee, Gyeongsangbuk-do (KR); Hyungsoo Lee, Seoul (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-do (KR)

(*) Notice: Subject to any disclaimer, the term of this patent is extended or adjusted under 35 U.S.C. 154(b) by 0 days.

(21) Appl. No.: 16/724,424

(22) Filed: Dec. 23, 2019

Related U.S. Application Data (60) Provisional application No. 62/799,139, filed on Jan. 31, 2019.

(51) Int. Cl.
*G06T 7/73* (2017.01)
*G06K 9/62* (2006.01)
(Continued)

(52) U.S. Cl.
CPC .............. *G06T 7/74* (2017.01); *G06K 9/6256* (2013.01); *G06N 3/04* (2013.01); *G06N 3/08* (2013.01);
(Continued)

(58) Field of Classification Search
CPC ............ G06T 7/74; G06T 2207/20081; G06K 9/6256; G06N 3/04; G06N 3/08
See application file for complete search history.

(56) References Cited

U.S. PATENT DOCUMENTS

10,325,179 B1 * 6/2019 Kim ................. G06K 9/6273
10,410,120 B1 * 9/2019 Kim ................. G06F 17/15
(Continued)

*Primary Examiner* — John B Strege
(74) *Attorney, Agent, or Firm* — Husch Blackwell LLP (57) ABSTRACT

A method for supporting at least one administrator to evaluate detecting processes of object detectors to provide logical grounds of an autonomous driving is provided. And the method includes steps of: (a) a computing device instructing convolutional layers, included in an object detecting CNN which has been trained before, to generate reference convolutional feature maps by applying convolutional operations to reference images inputted thereto, and instructing ROI pooling layers included therein to generate reference ROI-Pooled feature maps by pooling at least part of values corresponding to ROIs on the reference convolutional feature maps; and (b) the computing device instructing a representative selection unit to classify the reference ROI-Pooled feature maps by referring to information on classes of objects included in their corresponding ROIs on the reference images, and to generate at least one representative feature map per each class.

30 Claims, 4 Drawing Sheets

(51) Int. Cl.
*G06N 3/04* (2006.01)
*G06N 3/08* (2006.01)

(52) U.S. Cl.
CPC ............... *G06T 2207/20081* (2013.01); *G06T 2207/20084* (2013.01); *G06T 2207/30252* (2013.01)

(56) References Cited

U.S. PATENT DOCUMENTS

| | | | |
|---|---|---|---|
| 2017/0124415 A1* | 5/2017 | Choi | G06N 3/08 |
| 2017/0169315 A1* | 6/2017 | Vaca Castano | G06K 9/3233 |
| 2017/0206431 A1* | 7/2017 | Sun | G06N 3/084 |
| 2018/0137642 A1* | 5/2018 | Malisiewicz | G06K 9/6271 |
| 2019/0012548 A1* | 1/2019 | Levi | G06K 9/6267 |
| 2019/0073553 A1* | 3/2019 | Yao | G06K 9/46 |
| 2019/0188525 A1* | 6/2019 | Choi | G06N 3/08 |
| 2019/0361439 A1* | 11/2019 | Zeng | B60W 50/0097 |
| 2019/0361456 A1* | 11/2019 | Zeng | B60W 30/00 |

\* cited by examiner

METHOD AND DEVICE FOR SUPPORTING ADMINISTRATORS TO PROCESSES OF OBJECT DETECTORS TO PROVIDE LOGICAL DRIVING

CROSS REFERENCE OF RELATED APPLICATION

This present application claims the benefit of the earlier filing date of provisional patent application No. 62/799,139, filed Jan. 31, 2019, the entire contents of which being incorporated herein by reference.

FIELD OF THE DISCLOSURE

The present disclosure relates to a method and a device for use with an autonomous vehicle; and more particularly, to the method and the device for supporting administrators to evaluate object detecting processes of object detectors to provide logical grounds of autonomous driving.

BACKGROUND OF THE DISCLOSURE

Deep Convolutional Neural Networks (Deep CNNs) are at the heart of the remarkable development in deep learning. CNNs have already been used in the 90's to solve problems of character recognition, but their use has become as widespread as it is now thanks to recent researches. These CNNs have won the 2012 ImageNet image classification tournament, crushing other competitors. Then, the convolutional neural network became a very useful tool in the field of the machine learning.

Recently, the CNNs have been widely used in autonomous driving. The CNNs can perform various functions to support the autonomous driving, such as semantic segmentation, object detection, etc., for autonomous vehicles, which are learned by using tens of thousands of training data sets, and then installed on the autonomous vehicles.

However, it is difficult to determine whether or not the CNN operates in a stable condition while the CNN is operating a vehicle. It is very important to be able to know whether the CNN is operating in a normal condition, because it is necessary to notify a user to operate the vehicle if the CNN is operating in an unstable condition, and record any problems in order to improve the CNN in the future.

As a conventional technique, there is a method for presenting a basis for an object detection result of the CNN having a configuration satisfying a specific condition. However, the specific condition is very limited, and the conventional technique has a disadvantage that it is difficult to apply to general cases. That is, the CNN must be configured to use a Class Activation Map. Therefore, there is no prior art that can detect whether the CNN of the general configuration is stable or not.

SUMMARY OF THE DISCLOSURE

It is an object of the present disclosure to solve all the aforementioned problems.

It is another object of the present disclosure to provide a logical background for autonomous driving by presenting a method for evaluating each detecting process of an object detector by using each representative feature map of each object.

In accordance with one aspect of the present disclosure, there is provided a method for supporting at least one administrator to evaluate one or more detecting processes of one or more object detectors to provide logical grounds of an autonomous driving, including steps of: (a) a computing device instructing one or more convolutional layers, included in an object detecting CNN which has been trained before, to generate one or more reference convolutional feature maps by applying one or more convolutional operations to one or more reference images inputted thereto, and instructing one or more ROI pooling layers included therein to generate one or more reference ROI-Pooled feature maps by pooling at least part of values corresponding to ROIs, whose information was provided by an RPN interlocking with the object detecting CNN, on the reference convolutional feature maps; and (b) the computing device instructing a representative selection unit to classify the reference ROI-Pooled feature maps by referring to information on classes of objects included in their corresponding ROIs on the reference images, and to generate at least one representative feature map per each class, to thereby support the administrator to evaluate detecting processes of the object detecting CNN.

As one example, before the step (b), the computing device instructs the representative selection unit (i) to analyze relationships among FC neurons included in at least one FC layer of the object detecting CNN, (ii) to acquire a specific set of parameters of specific FC neurons for generating a specific final FC output value, used for determining whether information on an object corresponding to a feature map inputted thereto corresponds to a specific class, and (iii) to generate a specific integrated parameter vector by referring to the specific set of the parameters, and wherein, at the step of (b), the computing device instructs the representative selection unit to apply vector operations, which uses the specific integrated parameter vector, to one or more specific reference ROI-Pooled feature maps of the specific class, to thereby generate one or more specific reference FC feature maps, and then to thereby generate at least one specific representative feature map for the specific class by referring to the specific reference FC feature maps.

As one example, the specific integrated parameter vector is generated by referring to a following formula:

$$W^c = (w_1^c, w_2^c, \ldots, w_n^c), \text{ where } S_c = \sum_{x,y} \sum_k w_k^c f_k(x, y)$$

wherein $W^c$ denotes the specific integrated parameter vector for the specific class c, $f_k(x, y)$ denotes values of k-th channel included in one of the specific reference ROI-Pooled feature maps corresponding to one of the ROIs located in a coordinate (x,y) in one of the reference images, $S_c$ denotes the specific final FC output value, n denotes the number of channels of the specific reference ROI-Pooled feature maps.

As one example, at the step of (b), the computing device instructs the representative selection unit to calculate each average of each component included in the specific reference FC feature maps, to thereby generate the specific representative feature map.

As one example, the method further includes a step of (c): the computing device instructing the representative selection unit to select at least part of the specific reference FC feature maps by referring to the specific representative feature map, and to set some of the reference images corresponding to the selected specific reference FC feature maps as specific representative images for the specific class, to thereby support the administrator to evaluate the detecting processes of the object detecting CNN.

As one example, at the step of (c), the computing device instructs the representative selection unit to generate information on distances between the specific representative feature map and the specific reference FC feature maps, and select some of the specific reference FC feature maps, whose distances from the specific representative feature map are smallest, in order to set said specific representative images, wherein a specific ratio of the number of the selected specific reference FC feature maps and the number of the specific reference FC feature maps is predetermined.

As one example, at the step of (b), the computing device instructs the representative selection unit to classify the reference ROI-Pooled feature maps by referring to said information on the classes, and to calculate each average of each component included in specific reference ROI-Pooled feature maps whose corresponding objects are belonging to a specific class, to thereby generate at least one specific representative feature map for the specific class.

As one example, before the step (a), the computing device, if one or more training images are acquired, instructs the object detecting CNN to generate outputs for training by applying operations of the convolutional layers, the ROI pooling layers and FC layers to the training images, and to perform backpropagations by using the outputs for training and their corresponding GTs, to thereby learn parameters of at least part of the convolutional layers, the ROI pooling layers and the FC layers, and the training images include at least part of the reference images.

In accordance with another aspect of the present disclosure, there is provided a test method for supporting at least one administrator to evaluate one or more detecting processes of one or more object detectors to provide logical grounds of an autonomous driving, including steps of: (a) on condition that (1) a preparatory device has instructed one or more convolutional layers, included in an object detecting CNN which has been trained before, to generate one or more reference convolutional feature maps by applying one or more convolutional operations to one or more reference images inputted thereto, and has instructed one or more ROI pooling layers included therein to generate one or more reference ROI-Pooled feature maps by pooling at least part of values corresponding to ROIs, whose information was provided by an RPN interlocking with the object detecting CNN, on the reference convolutional feature maps; and (2) the preparatory device has instructed a representative selection unit to classify the reference ROI-Pooled feature maps by referring to information on classes of objects included in their corresponding ROIs on the reference images, and to generate at least one representative feature map per each class, to thereby support the administrator to evaluate detecting processes of the object detecting CNN, a testing device, if a test image is acquired, instructing the object detecting CNN to generate one or more testing ROI-Pooled feature maps by using its said convolutional layer, its said ROI pooling layer and its FC layer; and (b) the testing device instructing an evaluation unit to generate a reliability score corresponding to a result of an object detection on a specific object for testing, among objects for testing included in the test image, by referring to a specific testing ROI-Pooled feature map and at least one specific representative feature map corresponding to a specific class of the specific object for testing.

As one example, at the step of (b), the testing device instructs the evaluating unit to generate information on a distance between the specific representative feature map and a specific testing FC feature map, generated by applying FC operations to the specific testing ROI-Pooled feature map, and to generate the reliability score by referring to the information on the distance, on condition that representative feature maps including the specific representative feature map have been generated by using reference FC feature maps.

As one example, at the step of (b), the testing device instructs the evaluating unit to generate information on a distance between the specific representative feature map and the specific testing ROI-Pooled feature map, and to generate the reliability score by referring to the information on the distance, on condition that representative feature maps including the specific representative feature map have been generated by using reference ROI-Pooled feature maps.

As one example, the method further includes a step of: (c) the testing device instructing the evaluation unit to display at least part of specific representative images corresponding to the specific class to support the administrator to evaluate detecting processes of the object detecting CNN.

As one example, the testing device instructs the evaluation unit to generate information on distances between specific testing FC feature map generated by using the specific testing ROI-Pooled feature map and specific reference FC feature maps corresponding to the specific representative images, and to select some of the specific reference FC feature maps by referring to the information on the distances in order to select some of the specific representative images to be displayed, on condition that representative feature maps including the specific representative feature map have been generated by using reference FC feature maps.

As one example, the testing device instructs the evaluation unit to generate information on distances between the specific testing ROI-Pooled feature map and specific reference ROI-Pooled feature maps corresponding to the specific representative images, and to select some of the specific reference FC feature maps by referring to the information on the distances in order to select some of the specific representative images to be displayed, on condition that representative feature maps including the specific representative feature map have been generated by using the reference ROI-Pooled feature maps.

As one example, at the step of (b), the testing device instructs the object detecting CNN to acquire information on classes of the objects for testing included in the test image by using the FC layer, and instructs the evaluation unit to select the specific representative feature map by referring to information on the specific class of the specific object for testing, included in said information on classes of the objects for testing.

In accordance with still another aspect of the present disclosure, there is provided a computing device for supporting at least one administrator to evaluate one or more detecting processes of one or more object detectors to provide logical grounds of an autonomous driving, including: at least one memory that stores instructions; and at least one processor configured to execute the instructions to perform processes of: (I) instructing one or more convolutional layers, included in an object detecting CNN which has been trained before, to generate one or more reference convolutional feature maps by applying one or more convolutional operations to one or more reference images inputted thereto, and instructing one or more ROI pooling layers included therein to generate one or more reference ROI-Pooled feature maps by pooling at least part of values corresponding to ROIs, whose information was provided by an RPN interlocking with the object detecting CNN, on the reference convolutional feature maps; and (II) instructing a representative selection unit to classify the reference ROI-Pooled feature maps by referring to information on classes of objects included in their corresponding ROIs on the reference images, and to generate at least one representative feature map per each class, to thereby support the administrator to evaluate detecting processes of the object detecting CNN.

As one example, before the process (II), the processor instructs the representative selection unit (i) to analyze relationships among FC neurons included in at least one FC layer of the object detecting CNN, (ii) to acquire a specific set of parameters of specific FC neurons for generating a specific final FC output value, used for determining whether information on an object corresponding to a feature map inputted thereto corresponds to a specific class, and (iii) to generate a specific integrated parameter vector by referring to the specific set of the parameters, and wherein, at the process of (II), the processor instructs the representative selection unit to apply vector operations, which uses the specific integrated parameter vector, to one or more specific reference ROI-Pooled feature maps of the specific class, to thereby generate one or more specific reference FC feature maps, and then to thereby generate at least one specific representative feature map for the specific class by referring to the specific reference FC feature maps.

As one example, the specific integrated parameter vector is generated by referring to a following formula:

$$W^c = (w_1^c, w_2^c, \ldots, w_n^c), \text{ where } S_c = \sum_{x,y} \sum_k w_k^c f_k(x, y)$$

wherein $W^c$ denotes the specific integrated parameter vector for the specific class c, $f_k(x, y)$ denotes values of k-th channel included in one of the specific reference ROI-Pooled feature maps corresponding to one of the ROIs located in a coordinate (x,y) in one of the reference images, $S_c$ denotes the specific final FC output value, n denotes the number of channels of the specific reference ROI-Pooled feature maps.

As one example, at the process of (II), the processor instructs the representative selection unit to calculate each average of each component included in the specific reference FC feature maps, to thereby generate the specific representative feature map.

As one example, the processor further performs a process of (III): instructing the representative selection unit to select at least part of the specific reference FC feature maps by referring to the specific representative feature map, and to set some of the reference images corresponding to the selected specific reference FC feature maps as specific representative images for the specific class, to thereby support the administrator to evaluate the detecting processes of the object detecting CNN.

As one example, at the process of (III), the processor instructs the representative selection unit to generate information on distances between the specific representative feature map and the specific reference FC feature maps, and select some of the specific reference FC feature maps, whose distances from the specific representative feature map are smallest, in order to set said specific representative images, wherein a specific ratio of the number of the selected specific reference FC feature maps and the number of the specific reference FC feature maps is predetermined.

As one example, at the process of (II), the processor instructs the representative selection unit to classify the reference ROI-Pooled feature maps by referring to said information on the classes, and to calculate each average of each component included in specific reference ROI-Pooled feature maps whose corresponding objects are belonging to a specific class, to thereby generate at least one specific representative feature map for the specific class.

As one example, before the process (I), the processor, if one or more training images are acquired, instructs the object detecting CNN to generate outputs for training by applying operations of the convolutional layers, the ROI pooling layers and FC layers to the training images, and to perform backpropagations by using the outputs for training and their corresponding GTs, to thereby learn parameters of at least part of the convolutional layers, the ROI pooling layers and the FC layers, and the training images include at least part of the reference images.

In accordance with still yet another aspect of the present disclosure, there is provided a testing device for supporting at least one administrator to evaluate one or more detecting processes of one or more object detectors to provide logical grounds of an autonomous driving, including: at least one memory that stores instructions; and at least one processor configured to execute the instructions to perform processes of: (I) on condition that (1) a preparatory device has instructed one or more convolutional layers, included in an object detecting CNN which has been trained before, to generate one or more reference convolutional feature maps by applying one or more convolutional operations to one or more reference images inputted thereto, and has instructed one or more ROI pooling layers included therein to generate one or more reference ROI-Pooled feature maps by pooling at least part of values corresponding to ROIs, whose information was provided by an RPN interlocking with the object detecting CNN, on the reference convolutional feature maps; and (2) the preparatory device has instructed a representative selection unit to classify the reference ROI-Pooled feature maps by referring to information on classes of objects included in their corresponding ROIs on the reference images, and to generate at least one representative feature map per each class, to thereby support the administrator to evaluate detecting processes of the object detecting CNN, if a test image is acquired, instructing the object detecting CNN to generate one or more testing ROI-Pooled feature maps by using its said convolutional layer, its said ROI pooling layer and its FC layer; and (II) instructing an evaluation unit to generate a reliability score corresponding to a result of an object detection on a specific object for testing, among objects for testing included in the test image, by referring to a specific testing ROI-Pooled feature map and at least one specific representative feature map corresponding to a specific class of the specific object for testing.

As one example, at the process of (II), the processor instructs the evaluating unit to generate information on a distance between the specific representative feature map and a specific testing FC feature map, generated by applying FC operations to the specific testing ROI-Pooled feature map, and to generate the reliability score by referring to the information on the distance, on condition that representative feature maps including the specific representative feature map have been generated by using reference FC feature maps.

As one example, at the process of (II), the processor instructs the evaluating unit to generate information on a distance between the specific representative feature map and the specific testing ROI-Pooled feature map, and to generate the reliability score by referring to the information on the distance, on condition that representative feature maps including the specific representative feature map have been generated by using reference ROI-Pooled feature maps.

As one example, the computing device further performs a process of: (III) instructing the evaluation unit to display at least part of specific representative images corresponding to the specific class to support the administrator to evaluate detecting processes of the object detecting CNN.

As one example, the processor instructs the evaluation unit to generate information on distances between specific testing FC feature map generated by using the specific testing ROI-Pooled feature map and specific reference FC feature maps corresponding to the specific representative images, and to select some of the specific reference FC feature maps by referring to the information on the distances in order to select some of the specific representative images to be displayed, on condition that representative feature maps including the specific representative feature map have been generated by using reference FC feature maps.

As one example, the processor instructs the evaluation unit to generate information on distances between the specific testing ROI-Pooled feature map and specific reference ROI-Pooled feature maps corresponding to the specific representative images, and to select some of the specific reference FC feature maps by referring to the information on the distances in order to select some of the specific representative images to be displayed, on condition that representative feature maps including the specific representative feature map have been generated by using the reference ROI-Pooled feature maps.

As one example, at the process of (II), the processor instructs the object detecting CNN to acquire information on classes of the objects for testing included in the test image by using the FC layer, and instructs the evaluation unit to select the specific representative feature map by referring to information on the specific class of the specific object for testing, included in said information on classes of the objects for testing.

BRIEF DESCRIPTION OF THE DRAWINGS

The above and other objects and features of the present disclosure will become apparent from the following description of preferred embodiments given in conjunction with the accompanying drawings.

The following drawings to be used for explaining example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

For reference, in the description below, the phrase "for training" or "training" is added for terms related to the learning process, and the phrase "for testing" or "testing" is added for terms related to the testing process, to avoid possible confusion.

To allow those skilled in the art to carry out the present disclosure easily, the example embodiments of the present disclosure by referring to attached diagrams will be explained in detail as shown below.

Figure 1:
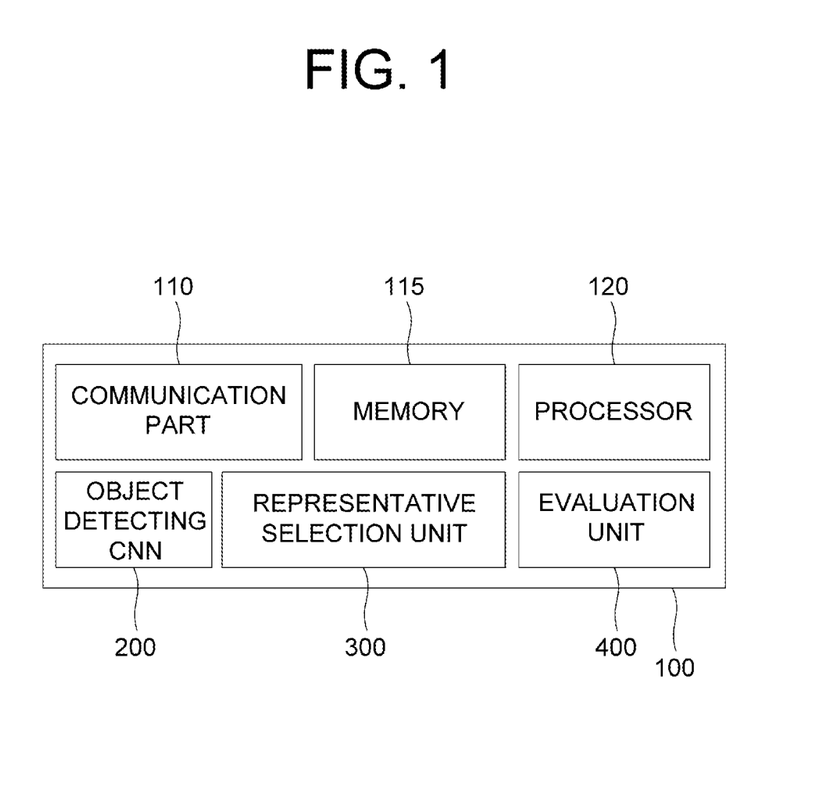
FIG. 1 is a drawing schematically illustrating a configuration of a computing device performing a method for supporting administrators to evaluate object detecting processes of object detectors to provide logical grounds of an autonomous driving in accordance with one example embodiment of the present disclosure.

FIG. 1 is a drawing schematically illustrating a configuration of a computing device 100 performing a method for supporting administrators to evaluate object detecting processes of object detectors to provide logical grounds of an autonomous driving in accordance with one example embodiment of the present disclosure.

By referring to FIG. 1, a computing device 100 may include at least one object detecting CNN 200, a representative selection unit 300, and an evaluation unit 400. Processes of input/output and computations of the object detecting CNN 200, the representative selection unit 300, and the evaluation unit 400 may be respectively performed by a communication part 110 and a processor 120 included in the computing device 100. Also, a memory 115 in the computing device 100 may have stored various instructions to be described later, and the processor 120 may execute the instructions stored in the memory 115 and may perform processes of the present disclosure by executing the instructions to be disclosed later. Such description of the computing device 100 does not exclude an integrated device including any combination of a processor, a memory, a medium, or any other computing components.

Figure 2:
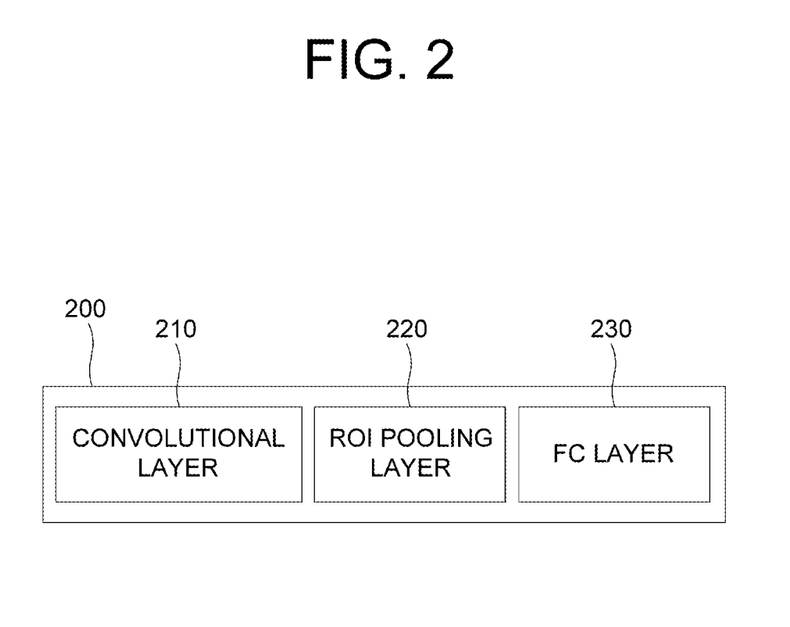
FIG. 2 is a drawing schematically illustrating a configuration of an object detecting CNN included in the computing device performing the method for supporting the administrators to evaluate the object detecting processes of the object detectors to provide the logical grounds of the autonomous driving in accordance with one example embodiment of the present disclosure.

In order to explain configurations of the object detecting CNN 200, FIG. 2 will be referred to.

FIG. 2 is a drawing schematically illustrating a configuration of the object detecting CNN included in the computing device performing the method for supporting the administrators to evaluate the object detecting processes of the object detectors to provide the logical grounds of the autonomous driving in accordance with one example embodiment of the present disclosure.

Herein, the object detecting CNN 200 may include at least one convolutional layer 210, at least one ROI pooling layer 220, and at least one FC layer 230. The convolutional layer 210 may apply one or more convolutional operations to at least one input image fed into the object detecting CNN 200, to thereby generate at least one feature map, and the ROI pooling layer 220 may apply one or more pooling operations to each of regions, corresponding to the each of ROIs, on the convolutional feature map. Thereafter, the FC layer 230 may generate each of bounding boxes including each of objects on the input image and information on its corresponding class by applying one or more FC operations to each of ROI-Pooled feature maps corresponding to each of the ROIs. The object detecting CNN 200 may have been learned in advance before applying a method in accordance with one example of the present disclosure.

The representative selection unit 300 and the evaluation unit 400 other than the object detecting CNN 200 will be described later specifically.

Figure 3:
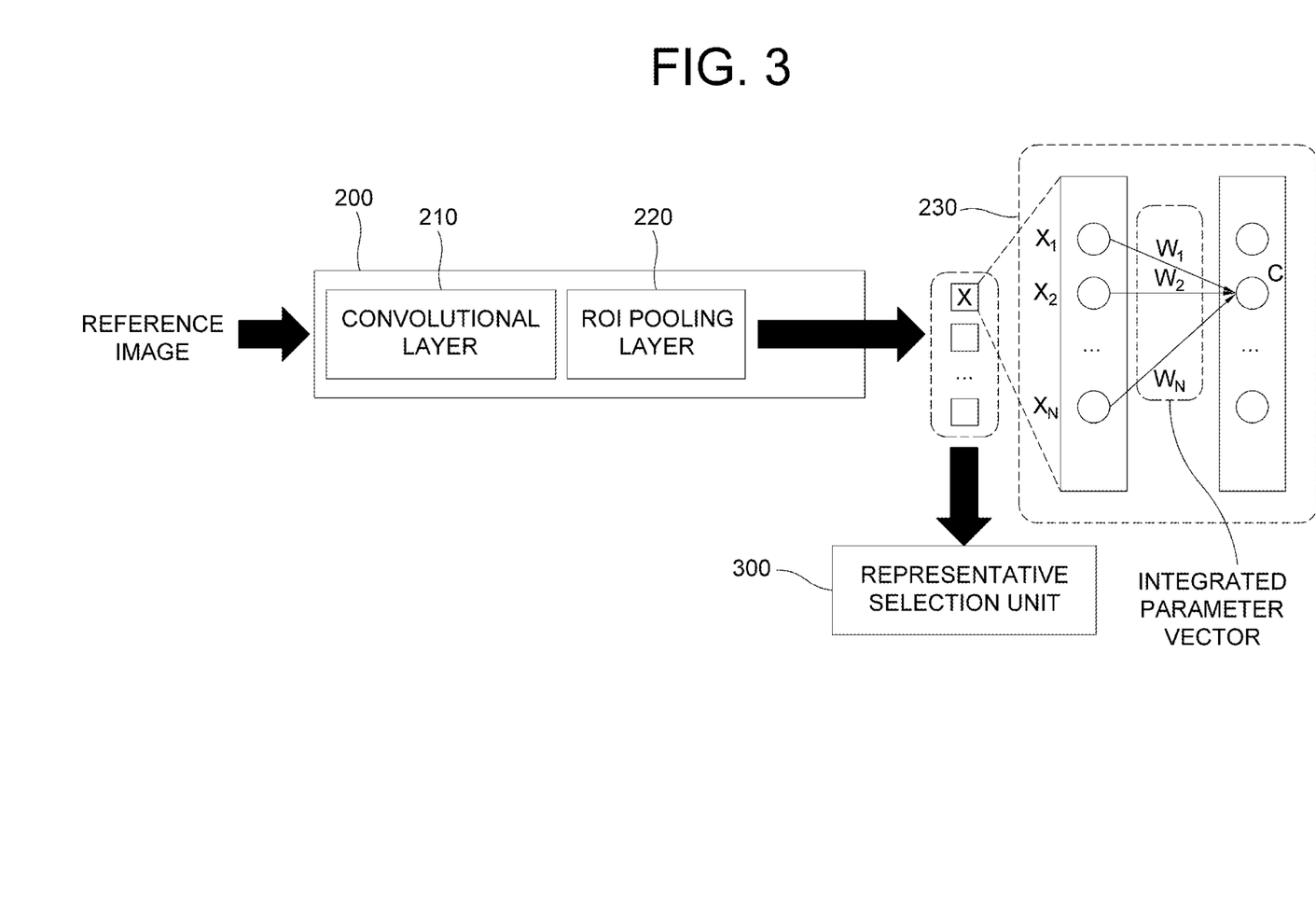
FIG. 3 is a drawing schematically illustrating a flow of preparatory processes of the method for supporting the administrators to evaluate the object detecting processes of the object detectors to provide the logical grounds of the autonomous driving in accordance with one example embodiment of the present disclosure.

FIG. 3 is a drawing schematically illustrating a flow of preparatory processes of the method for supporting the administrators to evaluate the object detecting processes of the object detectors to provide the logical grounds of the autonomous driving in accordance with one example embodiment of the present disclosure.

By referring to FIG. 3, first, the computing device 100 may acquire or support another device to acquire one or more reference images for generating one or more representative feature maps. Herein, the reference images may include at least part of training images having been used for the object detecting CNN 200 to learn object detection. Specifically, the training images may be inputted to the object detecting CNN 200, and operated by the convolutional layer 210, the ROI pooling layer 220 and the FC layer 230 to generate outputs for training. And, the outputs for training and their corresponding GTs may be used for backpropagation, to thereby learn parameters of at least part of the convolutional layer 210, the ROI pooling layer 220 and the FC layer 230. After such training images are used as shown above, at least part of them can be included in the reference images. However, the scope of the present disclosure is not limited thereto.

After such reference images are acquired, the computing device 100 may instruct the object detecting CNN 200 to apply each operation of each layer to the reference images. Specifically, the convolutional layer 210 may apply the convolutional operations to the reference images, to thereby generate one or more reference convolutional feature maps corresponding to the reference images. And, in parallel to those processes, the RPN, supportive of the object detecting CNN 200, may generate the ROIs, each of which is a region estimated as including each of the objects, on the reference images and may transmit the ROIs to the object detecting CNN 200. Thereafter, the ROI pooling layer 220 may apply the pooling operation to values of each region, corresponding to each of the ROIs, on the reference feature maps, to thereby generate one or more reference ROI-Pooled feature maps.

If the reference ROI-Pooled feature maps are generated, the computing device 100 may transmit the reference ROI-Pooled feature maps to the representative selection unit 300. The representative selection unit 300 may classify the reference ROI-Pooled feature maps into each class by referring to information on classes of objects included in their corresponding ROIs on the reference images. Such information can be acquired from each of GTs corresponding to each of the reference images. Thereafter, the representative selection unit 300 may generate each of the representative feature maps for each class as described below, by using each of the reference ROI-Pooled feature maps assorted as above.

As one example, the representative selection unit 300 may calculate each average of each component included in specific reference ROI-Pooled feature maps whose corresponding objects are belonging to a specific class, and may generate a specific representative feature map for the specific class including such averages as its components.

As another example, as a preliminary process for generating the specific representative feature map for the specific class, the representative selection unit 300 may analyze relationships among FC neurons included in the FC layer 230, and acquire sets of parameters corresponding to at least part of the FC neurons. Specifically, the representative selection unit 300 may acquire a specific set of parameters of specific FC neurons, which are used for generating a specific final FC output value. The specific final FC output value may be a value used for determining whether an object corresponding to an inputted feature map is included in a specific class or not. After such specific set is acquired, the representative selection unit 300 may generate a specific integrated parameter vector by referring to the specific set. Thereafter, the representative selection unit 300 may generate specific reference FC feature maps by applying one or more vector operations using the specific integrated parameter vector to the specific reference ROI-Pooled feature maps corresponding to the specific class. For example, the vector operations may include multiplying the specific integrated parameter vector and the specific reference ROI-Pooled feature maps. After, the representative selection unit 300 may calculate each average of each component included in the specific reference FC feature maps, and may generate a specific representative feature map for the specific class including such averages as its components.

For example, the object detecting CNN 200 in FIG. 3 may classify objects in its input image into classes of car, pedestrian, motorcycle, etc., then each of representative feature maps corresponding to a car class, a pedestrian class, and a motorcycle class may be generated. In FIG. 3, $w_1$, $w_2$, ..., $w_n$, etc. may denote parameters corresponding to the class of the pedestrian c among the parameters of the FC layer 230 aforementioned. As a result, the specific integrated parameter vector corresponding to the pedestrian class may be generated by referring to the parameters as such.

In order to explain above processes more precisely, a formula will be presented below.

$$W^c = (w_1^c, w_2^c, \ldots, w_n^c), \text{ where } S_c = \sum_{x,y} \sum_k w_k^c f_k(x, y)$$

Herein, $W^c$ may denote the specific integrated parameter vector for the specific class c, and $f_k(x, y)$ may denote values of k-th channel included in one of the specific reference ROI-Pooled feature maps corresponding to one of the ROIs located in a coordinate (x,y) in one of the reference images. And, $S_c$ may denote the specific final FC output value, and n may denote the number of channels of the specific reference ROI-Pooled feature maps. By referring to the formula, processes of generating the specific integrated parameter vector can be well understood.

Additionally, the computing device 100 may acquire representative images for each class by referring to each of the representative feature maps for each class. That is, for the specific class, the computing device 100 may instruct the representative selection unit 300 to select at least part of feature maps having been used for creating the specific representative feature map, and to set some of the reference images corresponding to the selected feature maps as specific representative images for the specific class. Specifically, the computing device 100 may instruct the representative selection unit 300 to generate information on distances between the specific representative feature map corresponding to the specific class and the feature maps having been used for creating the specific representative feature map, and may set some of the reference images corresponding to the feature maps whose distances are the smallest ones among the reference images. For reference, a ratio of the number of said some of the reference images to the number of the training images may be predetermined.

For instance, as a result of one example aforementioned, the representative selection unit 300 may generate the information on distances between the specific representative feature map and the specific reference ROI-Pooled feature maps. As a result of another example aforementioned, the representative selection unit 300 may generate the information on distances between the specific representative feature map and the specific reference FC feature maps. Processes hereinafter are same for both examples.

As a result, the representative feature maps and the representative images for each class detectable by the object detecting CNN 200 may be generated. Below, a method for the computing device 100 performing the test processes by using the representative feature maps is described.

Figure 4:
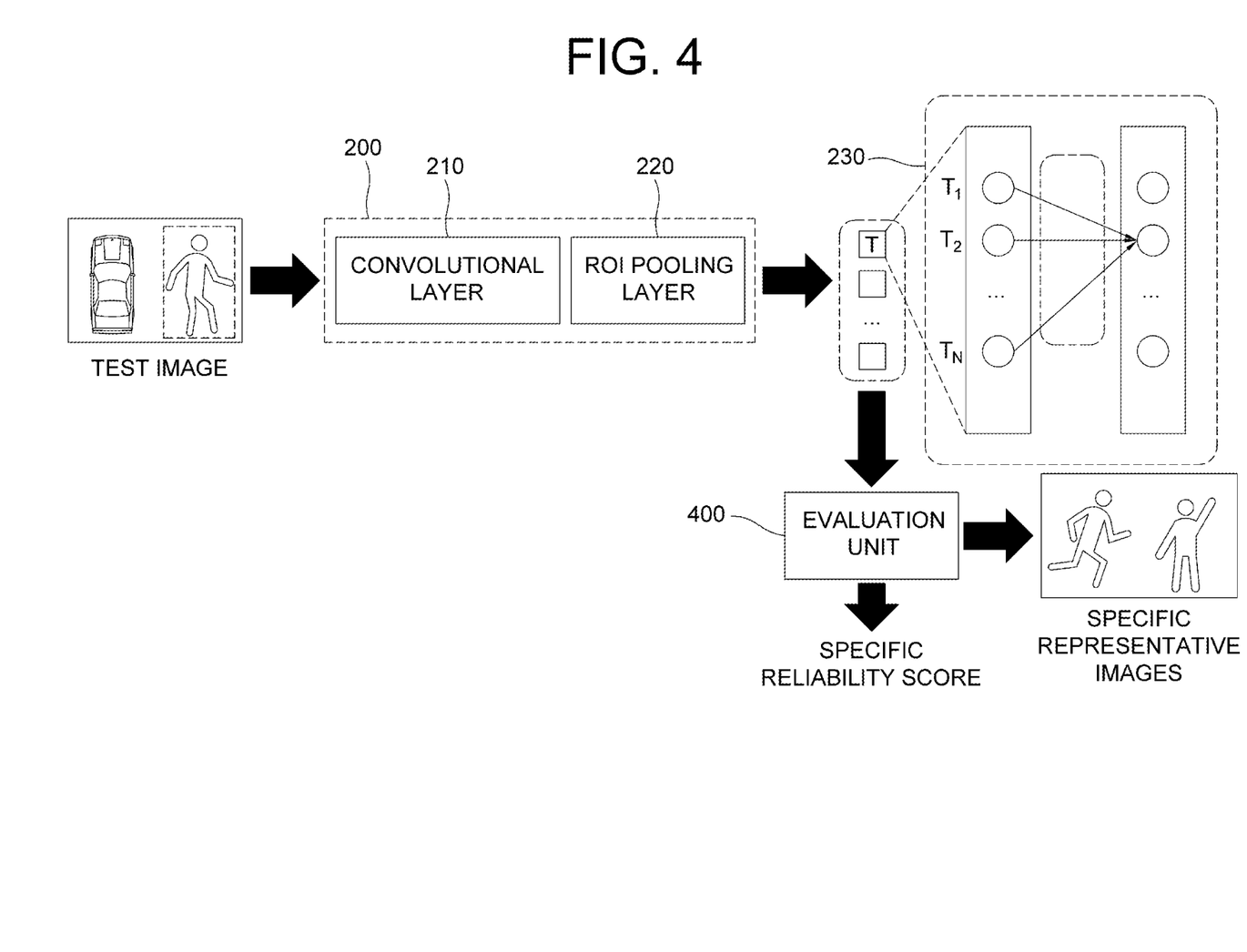
FIG. 4 is a drawing schematically illustrating a flow of testing processes of the method for supporting the administrators to evaluate the object detecting processes of the object detectors to provide the logical grounds of the autonomous driving in accordance with one example embodiment of the present disclosure.

FIG. 4 is a drawing schematically illustrating a flow of testing processes of the method for supporting the administrators to evaluate the object detecting processes of the object detectors to provide the logical grounds of the autonomous driving in accordance with one example embodiment of the present disclosure.

By referring to FIG. 4, the computing device 100 may acquire or support another device to acquire at least one test image. For example, if the computing device 100 is mounted on the autonomous vehicle, the test image may be one of images generated by a camera during operation of the autonomous vehicle. If the test image is acquired, the computing device 100 may instruct the object detecting CNN 200 to apply each operation of each layer to the test image. Specifically, the convolutional layer 210 may apply the convolutional operations to the test image, to thereby generate one or more testing convolutional feature maps corresponding to the test image. And, in parallel to those processes, the RPN, supportive of the object detecting CNN 200, may generate ROIs for testing, each of which is a region estimated as including each of objects for testing, on the test image and may transmit the ROIs for testing to the object detecting CNN 200. Thereafter, the ROI pooling layer 220 may apply the pooling operations to each region, corresponding to each of the ROIs for testing, on the testing convolutional feature maps, to thereby generate one or more testing ROI-Pooled feature maps.

Then, the FC layer 230 may generate each of testing FC feature maps by applying the FC operations to each of testing ROI-Pooled feature maps, and may thus generate information on each class of each object for testing and information on each bounding box for testing including the each object for testing on the test image. Herein, the information on each class of each object may include information on the specific class of the specific object for testing. That is, the testing device may instruct the object detecting CNN 200 to acquire information on classes of the objects for testing included in the test image by using the FC layer 230, and may instruct the evaluation unit to select said representative feature maps by using information on the classes of the objects for testing.

Herein, if the representative feature maps have been generated by using the reference ROI-Pooled feature maps, the computing device 100 may instruct the evaluation unit 400 to generate information on a distance between (i) a specific testing ROI-Pooled feature map, among the testing ROI-Pooled feature maps, corresponding to a specific object for testing and (ii) the specific representative feature map corresponding to the specific class estimated as including the specific object for testing, and may generate a specific reliability score of the specific object for testing by referring to the information on the distance.

Or, if the representative feature maps have been generated by using the reference FC feature maps, the computing device 100 may instruct the evaluation unit 400 to generate information on a distance between (i) a specific testing FC feature map, among the testing FC feature maps, corresponding to the specific object for testing and (ii) the specific representative feature map, and may generate the specific reliability score of the specific object for testing by referring to the information on the distance.

Herein, the information on the distance may be generated by calculating a Euclidean distance, an L1 distance, or an L-p distance between the two feature maps, but the scope of the present disclosure is not limited thereto.

Also, in addition to the process of calculating the specific reliability score, the computing device 100 may instruct the evaluation unit 400 to acquire at least part of the specific representative images corresponding to the specific class, to be displayed to and confirmed by an administrator.

Herein, if the representative feature maps have been generated by using the reference ROI-Pooled feature maps, the evaluation unit 400 may generate information on distances between the specific testing ROI-Pooled feature map and the specific reference ROI-Pooled feature maps corresponding to the specific representative images, and may select some of the specific reference ROI-Pooled feature maps by referring to the information on distances, to thereby select some of the specific representative images to be displayed. Herein, the specific representative images may correspond to the specific reference ROI-Pooled feature maps. Such information on the distances may be referred to in order to determine their order to be displayed.

Meanwhile, if the representative feature maps have been generated by using the reference FC feature maps, the evaluation unit 400 may generate information on distances between the specific testing FC feature map and the specific reference FC feature maps corresponding to the specific representative images, and may select some of the specific reference FC feature maps by referring to the information on distances, to thereby select some of the specific representative images to be displayed. Herein, the specific representative images may correspond to the specific reference FC feature maps. Such information on the distances may be referred to in order to determine their order to be displayed.

Below, the test method shown above will be explained with the preparatory processes interlocked. In the below explanation, a preparatory device and a testing device will be introduced. The preparatory device and the testing device may be same computing device such as the computing device 100, but it may not be the same. For example, the preparatory device may be the computing device 100, but the testing device may be a different computing device.

First, on condition that (1) the preparatory device has instructed the convolutional layer 210, included in the object detecting CNN 200 which has been trained before, to generate the reference convolutional feature maps by applying the convolutional operations to the reference images inputted thereto, and has instructed the ROI pooling layer 220 included therein to generate the reference ROI-Pooled feature maps by pooling at least part of values corresponding to ROIs, whose information was provided by the RPN interlocking with the object detecting CNN 200, on the reference convolutional feature maps; and (2) the preparatory device has instructed the representative selection unit 300 to classify the reference ROI-Pooled feature maps by referring to information on classes of objects included in their corresponding ROIs on the reference images, and to generate at least one representative feature map per each class, to thereby support the administrator to evaluate detecting processes of the object detecting CNN, a testing device, if the test image is acquired, may instruct the object detecting CNN 200 to generate the testing ROI-Pooled feature maps by using its said convolutional layer 210, its said ROI pooling layer 220 and its said FC layer 230.

Thereafter, the testing device may instruct an evaluation unit 400 to generate the specific reliability score corresponding to a result of an object detection on a specific object for testing, among objects for testing included in the test image, by referring to the specific testing ROI-Pooled feature map and the specific representative feature map corresponding to the specific class of the specific object for testing.

The processes after generating the images for confirming and the reliabilities of determination of each object by performing these processes for each object are described as below.

First, if the computing device 100 is mounted on the autonomous vehicle, the reliability score may be used for warning the driver. That is, if the reliability score falls below a certain threshold, the object detecting CNN 200 cannot be trusted any more, thus the driver may be warned such that the driver takes control of the autonomous vehicle and that the object detecting CNN 200 is updated.

Also, said at least part of the representative images, which were displayed, may help in finding out why and how the object detecting CNN 200 malfunctioned when the programmer maintains the object detecting CNN 200.

The present disclosure is related to an autonomous driving system using an explainable AI. Since the explainable AI can reason its own determining processes, a programmer can achieve functional safety more easily by building an autonomous driving system including the explainable AI. For example, a trained DNN may extract a feature map from its own inputted image, and compare the feature map with a corresponding representative feature map, to thereby generate a score of similarity between the two feature maps, which can be analyzed by a programmer. Thus, the present disclosure can be used for a fault tolerance and a fluctuation robustness in extreme situations.

The present disclosure has an effect of providing a basis of the reliability of the autonomous driving by presenting a method for evaluating each determination of the object detector by using each representative feature map of each object.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for supporting at least one administrator to evaluate one or more detecting processes of one or more object detectors to provide logical grounds of an autonomous driving, comprising steps of:
   (a) a computing device instructing one or more convolutional layers, included in an object detecting CNN which has been trained before, to generate one or more reference convolutional feature maps by applying one or more convolutional operations to one or more reference images inputted thereto, and instructing one or more ROI pooling layers included therein to generate one or more reference ROI-Pooled feature maps by pooling at least part of values corresponding to ROIs, whose information was provided by an RPN interlocking with the object detecting CNN, on the reference convolutional feature maps; and
   (b) the computing device instructing a representative selection unit to classify the reference ROI-Pooled feature maps by referring to information on classes of objects included in their corresponding ROIs on the reference images, and to generate at least one representative feature map per each class, to thereby support the administrator to evaluate detecting processes of the object detecting CNN.

2. The method of claim 1, wherein, before the step (b), the computing device instructs the representative selection unit (i) to analyze relationships among FC neurons included in at least one FC layer of the object detecting CNN, (ii) to acquire a specific set of parameters of specific FC neurons for generating a specific final FC output value, used for determining whether information on an object corresponding to a feature map inputted thereto corresponds to a specific class, and (iii) to generate a specific integrated parameter vector by referring to the specific set of the parameters, and
   wherein, at the step of (b), the computing device instructs the representative selection unit to apply vector operations, which uses the specific integrated parameter vector, to one or more specific reference ROI-Pooled feature maps of the specific class, to thereby generate one or more specific reference FC feature maps, and then to thereby generate at least one specific representative feature map for the specific class by referring to the specific reference FC feature maps.

3. The method of claim 2, wherein the specific integrated parameter vector is generated by referring to a following formula:

$$W^c = (w_1^c, w_2^c, \ldots, w_n^c), \text{ where } S_c = \sum_{x,y} \sum_k w_k^c f_k(x, y)$$

wherein $W^c$ denotes the specific integrated parameter vector for the specific class c, $f_k(x, y)$ denotes values of k-th channel included in one of the specific reference ROI-Pooled feature maps corresponding to one of the ROIs located in a coordinate (x,y) in one of the reference images, $S_c$ denotes the specific final FC output value, n denotes the number of channels of the specific reference ROI-Pooled feature maps.

4. The method of claim 2, wherein, at the step of (b), the computing device instructs the representative selection unit to calculate each average of each component included in the specific reference FC feature maps, to thereby generate the specific representative feature map.

5. The method of claim 2, further comprising: a step of (c), the computing device instructs the representative selection unit to select at least part of the specific reference FC feature maps by referring to the specific representative feature map, and to set some of the reference images corresponding to the selected specific reference FC feature maps as specific representative images for the specific class, to thereby support the administrator to evaluate the detecting processes of the object detecting CNN.

6. The method of claim 5, wherein, at the step of (c), the computing device instructs the representative selection unit to generate information on distances between the specific representative feature map and the specific reference FC feature maps, and select some of the specific reference FC feature maps, whose distances from the specific representative feature map are smallest, in order to set said specific representative images, wherein a specific ratio of the number of the selected specific reference FC feature maps and the number of the specific reference FC feature maps is predetermined.

7. The method of claim 1, wherein, at the step of (b), the computing device instructs the representative selection unit to classify the reference ROI-Pooled feature maps by referring to said information on the classes, and to calculate each average of each component included in specific reference ROI-Pooled feature maps whose corresponding objects are belonging to a specific class, to thereby generate at least one specific representative feature map for the specific class.

8. The method of claim 1, wherein, before the step (a), the computing device, if one or more training images are acquired, instructs the object detecting CNN to generate outputs for training by applying operations of the convolutional layers, the ROI pooling layers and FC layers to the training images, and to perform backpropagations by using the outputs for training and their corresponding GTs, to thereby learn parameters of at least part of the convolutional layers, the ROI pooling layers and the FC layers, and the training images include at least part of the reference images.

9. A test method for supporting at least one administrator to evaluate one or more detecting processes of one or more object detectors to provide logical grounds of an autonomous driving, comprising steps of:
   (a) on condition that (1) a preparatory device has instructed one or more convolutional layers, included in an object detecting CNN which has been trained before, to generate one or more reference convolutional feature maps by applying one or more convolutional operations to one or more reference images inputted thereto, and has instructed one or more ROI pooling layers included therein to generate one or more reference ROI-Pooled feature maps by pooling at least part of values corresponding to ROIs, whose information was provided by an RPN interlocking with the object detecting CNN, on the reference convolutional feature maps; and (2) the preparatory device has instructed a representative selection unit to classify the reference ROI-Pooled feature maps by referring to information on classes of objects included in their corresponding ROIs on the reference images, and to generate at least one representative feature map per each class, to thereby support the administrator to evaluate detecting processes of the object detecting CNN, a testing device, if a test image is acquired, instructing the object detecting CNN to generate one or more testing ROI-Pooled feature maps by using its said convolutional layer, its said ROI pooling layer and its FC layer; and (b) the testing device instructing an evaluation unit to generate a reliability score corresponding to a result of an object detection on a specific object for testing, among objects for testing included in the test image, by referring to a specific testing ROI-Pooled feature map and at least one specific representative feature map corresponding to a specific class of the specific object for testing.

10. The method of claim 9, wherein, at the step of (b), the testing device instructs the evaluating unit to generate information on a distance between the specific representative feature map and a specific testing FC feature map, generated by applying FC operations to the specific testing ROI-Pooled feature map, and to generate the reliability score by referring to the information on the distance, on condition that representative feature maps including the specific representative feature map have been generated by using reference FC feature maps.

11. The method of claim 9, wherein, at the step of (b), the testing device instructs the evaluating unit to generate information on a distance between the specific representative feature map and the specific testing ROI-Pooled feature map, and to generate the reliability score by referring to the information on the distance, on condition that representative feature maps including the specific representative feature map have been generated by using reference ROI-Pooled feature maps.

12. The method of claim 9, wherein the method further comprising: a step of:
(c) the testing device instructing the evaluation unit to display at least part of specific representative images corresponding to the specific class to support the administrator to evaluate detecting processes of the object detecting CNN.

13. The method of claim 12, wherein the testing device instructs the evaluation unit to generate information on distances between specific testing FC feature map generated by using the specific testing ROI-Pooled feature map and specific reference FC feature maps corresponding to the specific representative images, and to select some of the specific reference FC feature maps by referring to the information on the distances in order to select some of the specific representative images to be displayed, on condition that representative feature maps including the specific representative feature map have been generated by using reference FC feature maps.

14. The method of claim 12, wherein the testing device instructs the evaluation unit to generate information on distances between the specific testing ROI-Pooled feature map and specific reference ROI-Pooled feature maps corresponding to the specific representative images, and to select some of the specific reference FC feature maps by referring to the information on the distances in order to select some of the specific representative images to be displayed, on condition that representative feature maps including the specific representative feature map have been generated by using the reference ROI-Pooled feature maps.

15. The method of claim 9, wherein, at the step of (b), the testing device instructs the object detecting CNN to acquire information on classes of the objects for testing included in the test image by using the FC layer, and instructs the evaluation unit to select the specific representative feature map by referring to information on the specific class of the specific object for testing, included in said information on classes of the objects for testing.

16. A computing device for supporting at least one administrator to evaluate one or more detecting processes of one or more object detectors to provide logical grounds of an autonomous driving, comprising:
at least one memory that stores instructions; and
at least one processor configured to execute the instructions to perform processes of: (I) instructing one or more convolutional layers, included in an object detecting CNN which has been trained before, to generate one or more reference convolutional feature maps by applying one or more convolutional operations to one or more reference images inputted thereto, and instructing one or more ROI pooling layers included therein to generate one or more reference ROI-Pooled feature maps by pooling at least part of values corresponding to ROIs, whose information was provided by an RPN interlocking with the object detecting CNN, on the reference convolutional feature maps; and (II) instructing a representative selection unit to classify the reference ROI-Pooled feature maps by referring to information on classes of objects included in their corresponding ROIs on the reference images, and to generate at least one representative feature map per each class, to thereby support the administrator to evaluate detecting processes of the object detecting CNN.

17. The computing device of claim 16, wherein, before the process (II), the processor instructs the representative selection unit (i) to analyze relationships among FC neurons included in at least one FC layer of the object detecting CNN, (ii) to acquire a specific set of parameters of specific FC neurons for generating a specific final FC output value, used for determining whether information on an object corresponding to a feature map inputted thereto corresponds to a specific class, and (iii) to generate a specific integrated parameter vector by referring to the specific set of the parameters, and
wherein, at the process of (II), the processor instructs the representative selection unit to apply vector operations, which uses the specific integrated parameter vector, to one or more specific reference ROI-Pooled feature maps of the specific class, to thereby generate one or more specific reference FC feature maps, and then to thereby generate at least one specific representative feature map for the specific class by referring to the specific reference FC feature maps.

18. The computing device of claim 17, wherein the specific integrated parameter vector is generated by referring to a following formula:

$$W^c = (w_1^c, w_2^c, \ldots, w_n^c), \text{ where } S_c = \sum_{x,y} \sum_k w_k^c f_k(x, y)$$

wherein $W^c$ denotes the specific integrated parameter vector for the specific class c, $f_k(x, y)$ denotes values of k-th channel included in one of the specific reference ROI-Pooled feature maps corresponding to one of the ROIs located in a coordinate (x,y) in one of the reference images, $S_c$ denotes the specific final FC output value, n denotes the number of channels of the specific reference ROI-Pooled feature maps.

19. The computing device of claim 17, wherein, at the process of (II), the processor instructs the representative selection unit to calculate each average of each component included in the specific reference FC feature maps, to thereby generate the specific representative feature map.

20. The computing device of claim 17, wherein the processor further performs a process of (III), the processor instructs the representative selection unit to select at least part of the specific reference FC feature maps by referring to the specific representative feature map, and to set some of the reference images corresponding to the selected specific reference FC feature maps as specific representative images for the specific class, to thereby support the administrator to evaluate the detecting processes of the object detecting CNN.

21. The computing device of claim 20, wherein, at the process of (III), the processor instructs the representative selection unit to generate information on distances between the specific representative feature map and the specific reference FC feature maps, and select some of the specific reference FC feature maps, whose distances from the specific representative feature map are smallest, in order to set said specific representative images, wherein a specific ratio of the number of the selected specific reference FC feature maps and the number of the specific reference FC feature maps is predetermined.

22. The computing device of claim 16, wherein, at the process of (II), the processor instructs the representative selection unit to classify the reference ROI-Pooled feature maps by referring to said information on the classes, and to calculate each average of each component included in specific reference ROI-Pooled feature maps whose corresponding objects are included in a specific class, to thereby generate at least one specific representative feature map for the specific class.

23. The computing device of claim 16, wherein, before the process (I), the processor, if one or more training images are acquired, instructs the object detecting CNN to generate outputs for training by applying operations of the convolutional layers, the ROI pooling layers and FC layers to the training images, and to perform backpropagations by using the outputs for training and their corresponding GTs, to thereby learn parameters of at least part of the convolutional layers, the ROI pooling layers and the FC layers, and the training images include at least part of the reference images.

24. A testing device for supporting at least one administrator to evaluate one or more detecting processes of one or more object detectors to provide logical grounds of an autonomous driving, comprising:
at least one memory that stores instructions; and
at least one processor configured to execute the instructions to perform processes of: (I) on condition that (1) a preparatory device has instructed one or more convolutional layers, included in an object detecting CNN which has been trained before, to generate one or more reference convolutional feature maps by applying one or more convolutional operations to one or more reference images inputted thereto, and has instructed one or more ROI pooling layers included therein to generate one or more reference ROI-Pooled feature maps by pooling at least part of values corresponding to ROIs, whose information was provided by an RPN interlocking with the object detecting CNN, on the reference convolutional feature maps; and (2) the preparatory device has instructed a representative selection unit to classify the reference ROI-Pooled feature maps by referring to information on classes of objects included in their corresponding ROIs on the reference images, and to generate at least one representative feature map per each class, to thereby support the administrator to evaluate detecting processes of the object detecting CNN, if a test image is acquired, instructing the object detecting CNN to generate one or more testing ROI-Pooled feature maps by using its said convolutional layer, its said ROI pooling layer and its FC layer; and (II) instructing an evaluation unit to generate a reliability score corresponding to a result of an object detection on a specific object for testing, among objects for testing included in the test image, by referring to a specific testing ROI-Pooled feature map and at least one specific representative feature map corresponding to a specific class of the specific object for testing.

25. The testing device of claim 24, wherein, at the process of (II), the processor instructs the evaluating unit to generate information on a distance between the specific representative feature map and a specific testing FC feature map, generated by applying FC operations to the specific testing ROI-Pooled feature map, and to generate the reliability score by referring to the information on the distance, on condition that representative feature maps including the specific representative feature map have been generated by using reference FC feature maps.

26. The testing device of claim 24, wherein, at the process of (II), the processor instructs the evaluating unit to generate information on a distance between the specific representative feature map and the specific testing ROI-Pooled feature map, and to generate the reliability score by referring to the information on the distance, on condition that representative feature maps including the specific representative feature map have been generated by using reference ROI-Pooled feature maps.

27. The testing device of claim 24, wherein the computing device further performs a process of:
(III) instructing the evaluation unit to display at least part of specific representative images corresponding to the specific class to support the administrator to evaluate detecting processes of the object detecting CNN.

28. The testing device of claim 27, wherein the processor instructs the evaluation unit to generate information on distances between specific testing FC feature map generated by using the specific testing ROI-Pooled feature map and specific reference FC feature maps corresponding to the specific representative images, and to select some of the specific reference FC feature maps by referring to the information on the distances in order to select some of the specific representative images to be displayed, on condition that representative feature maps including the specific representative feature map have been generated by using reference FC feature maps.

29. The testing device of claim 27, wherein the processor instructs the evaluation unit to generate information on distances between the specific testing ROI-Pooled feature map and specific reference ROI-Pooled feature maps corresponding to the specific representative images, and to select some of the specific reference FC feature maps by referring to the information on the distances in order to select some of the specific representative images to be displayed, on condition that representative feature maps including the specific representative feature map have been generated by using the reference ROI-Pooled feature maps.

30. The testing device of claim 24, wherein, at the process of (II), the processor instructs the object detecting CNN to acquire information on classes of the objects for testing included in the test image by using the FC layer, and instructs the evaluation unit to select the specific representative feature map by referring to information on the specific class of the specific object for testing, included in said information on classes of the objects for testing.

* * * * *